(12) United States Patent
Kennedy

(10) Patent No.: US 6,305,661 B1
(45) Date of Patent: Oct. 23, 2001

(54) MOLD FOR MAKING ROTATIONALLY ASYMMETRIC CONTACT LENSES

(75) Inventor: Gabriel Philip Kennedy, Tramore (IE)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/392,595

(22) Filed: Sep. 9, 1999

Related U.S. Application Data

(62) Division of application No. 09/095,703, filed on Jun. 9, 1998, now Pat. No. 5,968,422.
(60) Provisional application No. 60/058,096, filed on Jun. 30, 1997.

(51) Int. Cl.[7] ...................................................... B29D 11/00
(52) U.S. Cl. ........................... 249/117; 425/175; 425/808
(58) Field of Search ............................ 249/117; 425/808, 425/175; 264/1.1, 2.5, 219

(56) References Cited

U.S. PATENT DOCUMENTS

| | | | |
|---|---|---|---|
| 5,110,278 | 5/1992 | Tait et al. .............................. | 425/175 |
| 5,271,875 | 12/1993 | Appleton et al. ...................... | 264/2.3 |
| 5,407,062 | 4/1995 | Pierce et al. ........................... | 206/5.1 |
| 5,456,864 | 10/1995 | Wickes et al. ......................... | 264/2.5 |
| 5,466,147 | 11/1995 | Appleton et al. ..................... | 425/412 |
| 5,601,759 | 2/1997 | Apollonio .............................. | 264/2.5 |
| 5,611,970 | 3/1997 | Apollonio et al. .................... | 264/2.5 |
| 5,702,735 | 12/1997 | Martin et al. ......................... | 425/548 |
| 5,716,540 | 2/1998 | Matiacio et al. ...................... | 249/117 |
| 5,843,346 | 12/1998 | Morrill .................................. | 264/2.5 |

FOREIGN PATENT DOCUMENTS

405337957 * 12/1993 (JP) .
WO 94/07684   4/1994 (WO) .

\* cited by examiner

*Primary Examiner*—Nam Nguyen
*Assistant Examiner*—Donald Heckenberg
(74) *Attorney, Agent, or Firm*—John E. Thomas

(57) ABSTRACT

A mold is disclosed for making rotationally asymmetric contact lenses. The mold comprises a first concave or convex surface that is rotationally asymmetric for forming the surface of the contact lens thereagainst, a second concave or convex surface opposed to the first surface that is also rotationally asymmetric, and a segment of the mold between the first and second surfaces having a substantially uniform thickness.

14 Claims, 2 Drawing Sheets

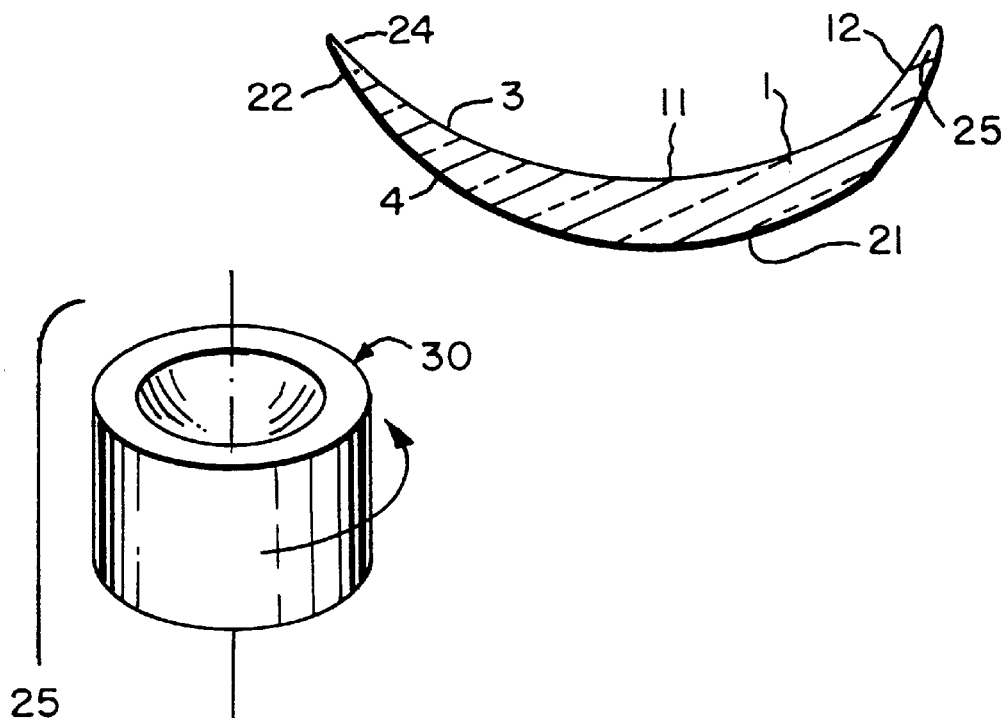
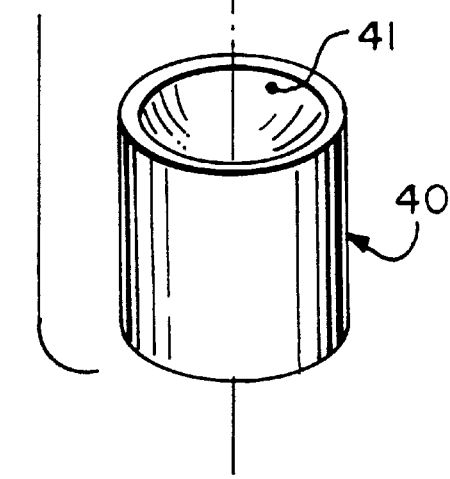
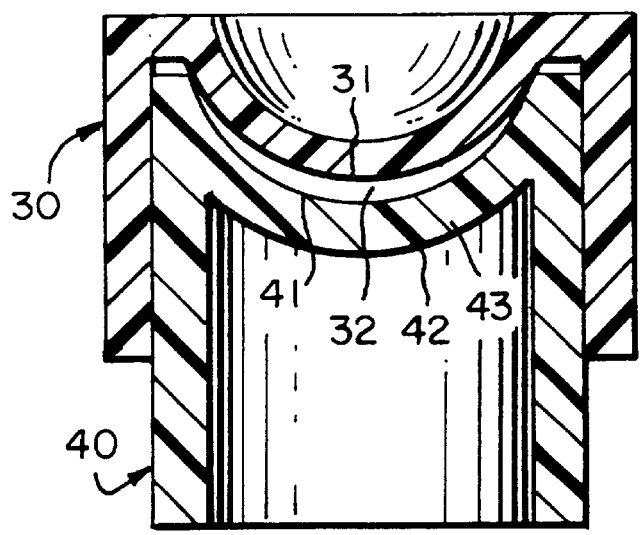

MOLD FOR MAKING ROTATIONALLY ASYMMETRIC CONTACT LENSES

This application is a divisional of Ser. No. 09/095,703, filed on Jun. 9, 1998, now U.S. Pat. No. 5,968,422, which claims the benefit of U.S. Provisional Application No. 60/058,096 filed on Jun. 30, 1997.

BACKGROUND OF THE INVENTION

This invention relates to a method of injection molding contact lens molds for cast molding contact lenses having a rotationally asymmetric lens surface, and apparatus for carrying out the method.

One method in practice for making contact lenses is cast molding. Cast molding of contact lenses involves depositing a curable mixture of polymerizable monomers in a mold cavity formed by two mold sections, curing the monomer mixture, and disassembling the mold assembly and removing the lens. Other processing steps, for example, hydration in the case of hydrogel lenses, may also be employed. One mold section forms the anterior lens surface (anterior mold section), and the other mold section forms the posterior lens surface (posterior mold section). Prior to the cast molding of the contact lens, each of the mold sections is formed by injection molding a resin in the cavity of an injection molding apparatus. Mounted in the injection molding apparatus are tools for forming the optical surfaces on the mold sections. Whereas the mold sections are typically used only once for casting a lens, the injection molding tools are used to make hundreds of molds.

Several known cast molding methods have the potential to mold a finished contact lens, for example, U.S. Pat. No. 5,271,875 (Appleton et al.). Since these methods avoid time-consuming and labor-intensive operations such as lathing, the methods have been found to offer the potential to reduce production time and cost for the manufacture of spherical contact lenses.

However, various problems have been encountered in employing cast molding technology for manufacturing other types of contact lenses, especially contact lenses that have at least one rotationally asymmetric surface. As one example, toric contact lenses (i.e., contact lenses having a toric optical zone that are used to correct refractive abnormalities of the eye associated pith astigmatism) have at least one surface that is not rotationally symmetric. The problems encountered may be due to several factors. First, the toric optical zone is not spherical. Second, toric contact lenses include some type of ballast (such as prism ballast or slab-off zones) to inhibit rotation of the lens on the eye so that the cylindrical axis of the toric zone remains generally aligned with the axis of the astigmatism; in order to provide such ballast, the edge thickness of the lens is not uniform about the entire circumference of the lens. As another example of such lenses, many mulitfocal designs are not rotationally symmetric.

Applicant found that, in forming contact lens molds for molding lenses having a rotationally asymmetric lens surface, problems were encountered in consistently obtaining contact lens molds having the same geometries. Such inconsistencies in the contact lens mold geometries translated to inconsistencies in cast molding contact lenses in the molds. The present invention solves this problem.

SUMMARY OF THE INVENTION

The invention provides an improved method for injection molding a contact lens mold having a rotationally asymmetric molding surface. The method comprises: providing a first molding tool including a convex molding surface, and a second molding tool including a concave molding surface, wherein one of said convex or concave molding surfaces has an optical quality finish and is rotationally asymmetric, said one molding surface for forming an optical surface on the contact lens mold, and the other of said convex or concave molding surface is rotationally asymmetric; positioning the molding tools in opposed relationship to form a space therebetween, such that the respective molding surfaces are spaced substantially uniformly across their surfaces; and injecting a plastic resin into a space formed between the molding surfaces.

The method is especially useful for injection molding contact lens molds having a mold cavity defining surface for forming a toric contact lens surface molded thereagainst, and more particularly, for contact lens molds having a mold cavity defining surface shaped to provide ballast to a contact lens surface molded thereagainst.

The invention further includes an assembly for carrying out the method, and contact lens molds formed by the method.

BRIEF DESCRIPTION OF THE DRAWINGS

FIG. 1 is a schematic cross-sectional view of a representative toric contact lens.

FIG. 2 is a schematic exploded view of a representative mold assembly.

FIG. 3 is a schematic cross-sectional view of the mold assembly of FIG. 2 assembled for cast molding a contact lens.

DETAILED DESCRIPTION OF PREFERRED EMBODIMENTS

Figure 4:
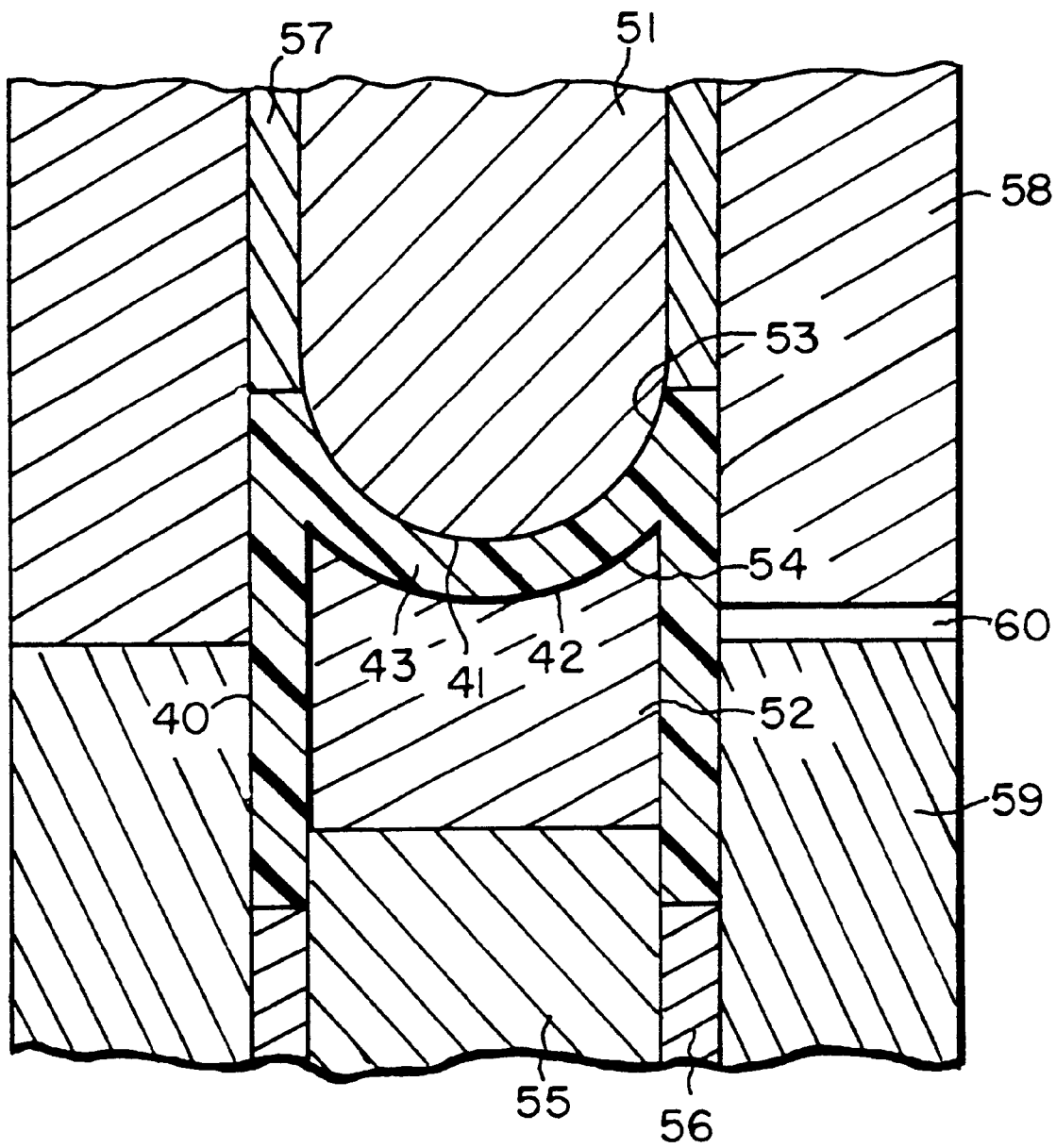
FIG. 4 is a schematic cross-sectional view of tooling for injection molding an anterior mold section of the assembly shown in FIGS. 2 and 3.

FIG. 1 schematically illustrates a representative contact lens having a rotationally asymmetric surface. For this described preferred embodiment, contact lens 1 is a toric contact lens, although the invention is applicable to other contact lenses having at least one rotationally asymmetric surface. As used herein, the term "rotationally asymmetric surface" denotes a surface that is not a second-order surface of revolution, such as a torus section.

Central zone 11 of posterior surface 3 is toric, i.e., this zone has a toric surface that provides the desired cylindrical correction. Posterior surface 3 may optionally include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 includes at least one peripheral curve 22 surrounding central zone 21. Lens 1 is provided with ballast so that the lens maintains a desired rotational orientation on the eye. For the described embodiment, schematically shown in FIG. 1, peripheral section 24 has a different thickness than an opposed peripheral section 25 of the lens periphery due primarily to the ballast in surface 4; thus, anterior surface 4 is not rotationally symmetric. Other ballast types for inhibiting rotation of the contact lens on the eye are known in the art, and the invention is applicable for such other ballast types that require a rotationally asymmetric surface. It is further noted that for toric lens designs, the centerpoint of central zone 21 is not necessarily aligned with the center of lens 1, thereby further contributing to surface 4 not being rotationally symmetric.

A representative mold assembly 25 for the method of this invention is shown in FIGS. 2 and 3. The mold assembly includes posterior mold 30 having a posterior mold cavity defining surface 31 (which forms the posterior surface of the molded lens), and anterior mold 40 having an anterior mold cavity defining surface 41 (which forms the anterior surface of the molded lens). Each of the mold sections is injection molded from a plastic resin, such as polypropylene or polystyrene, in an injection molding apparatus, as described in more detail below. When the mold sections are assembled, a mold cavity 32 is formed between the two defining surfaces that corresponds to the desired shape of the contact lens molded therein. Accordingly, for the described embodiment, posterior mold cavity defining surface 31 has a toric central zone (for forming the toric posterior surface of the toric contact lens) having a cylindrical axis, and anterior mold cavity defining surface 41 has a configuration that will provide ballast to a lens molded in mold cavity 32. Of course, surfaces 31, 41 may also include curves for forming desired peripheral curves on the lens, and the central zones of surfaces 31, 41 may be designed to provide a desired spherical correction to the molded toric lens.

As mentioned above, the posterior and anterior mold sections are injection molded from a plastic resin in an injection molding apparatus. FIG. 4 illustrates schematically an injection mold arrangement for the injection molding of anterior mold section 40. As seen in the Figures, anterior mold section 40 includes surface 42 opposed to anterior mold cavity defining surface 41, surfaces 41 and 42 defining segment 43 therebetween of mold section 40. Tools 51,52 are mounted in the injection molding apparatus. Tool 51 has an optical quality finish on its molding surface 53 since tool 51 is used to form mold anterior cavity defining surface 41. (As used herein, the term "optical quality finish" denotes a molding surface that is sufficiently smooth for ultimately forming the optical surface of a contact lens, e.g., the produced contact lens is suitable for placement in the eye without the need to machine or polish the formed lens surface.) Tool 52, used to form opposed surface 42, does not need to have an optical quality finish on its molding surface 54 since opposed surface 42 of contact lens mold 40 does not contact the polymerizable lens mixture in casting contact lenses, i.e., opposed surface 42 does not form part of mold cavity 32.

According to conventional methods of injection molding such a contact lens mold, the shape of opposed surface 42 was not considered particularly critical. Therefore, tool molding surface 54 would generally have a shape that was easy to machine in order to avoid unnecessary labor and expense in forming the molding surface on tool 52, i.e., this tool molding surface would be formed of rotationally symmetric curves especially spherical curves.

However, applicant found that, in forming contact lens molds for molding lenses having a rotationally asymmetric lens surface, a problem of inconsistent molding of contact lens molds was encountered. More specifically, it was discovered that when surface 53 of tool 52 was made with a rotationally symmetric molding surface as in conventional methods, it was difficult to obtain contact lens molds having consistent geometries, which translated to inconsistencies in the casting of lenses in the contact lens molds. It is believed that there was still sufficient mismatch between the shapes of surfaces 41 and 42, especially in the region of the molding surfaces that provide ballast, that uneven resin flow occurred in injection molding the contact lens mold, thus causing the inconsistency in the injection molding process.

The present invention solved this problem by providing molding tool 52 with a molding surface 54 that is rotationally asymmetric, such that when the two molding tools 51,52 are positioned in opposed relationship, molding surfaces 53,54 are spaced substantially uniformly across their surfaces. Preferably, tools 51 and 52 are locked into these positions with respect to one another. It is believed that this uniformity in the space formed between the molding surfaces 53,54 results in more uniform flow of resin during injection molding, and thereby provides more consistency in the injection molding of the contact lens mold sections. Preferably, surface 54 has curves approximating each of the curves on surface 53. Molding surfaces 53, 54 should be shaped so that the thickness of section 43 varies no more than 0.2 mm, more preferably no more than 0.15 mm, and especially no more than 0.1 mm, across its profile.

(It is noted that due to the scale of FIG. 4, the various curves of surfaces 41 and 42 are not visibly illustrated; similarly, the various curves of surface 31 is not illustrated in FIG. 3. However, for the described embodiment, it is evident that surface 31 would be shaped to provide contact lens surface 21, and surfaces 41,42 of the tools would be shaped accordingly. As discussed above, for the described embodiment, lens 1 does not include a uniform peripheral thickness due primarily to inclusion of a ballast.)

Tools 51,52 are typically made from brass, stainless steel or nickel or some combination thereof, and the desired molding surface is formed on the tools according to generally methods known in the art, such as lathe cutting. Alternately, if the tool surface has a shape that is difficult to lathe cut, other methods are generally available in the art, such as electrodischarge machining. After forming the desired surface, surface 53 of tool 51 is polished to achieve precision surface quality so that no surface imperfections are transferred to the mold section being injection molded therefrom. Surface 54 of tool 52 does not require such degree of polishing, since it is not used to form an optical surface, and therefore, the molding surface 54 of tool 52 does not need to correspond exactly to surface 53. As shown schematically in FIG. 4, the end of tool 52 opposite surface 54 is designed to mount the tool in insert 55, surrounded by ejector sleeve 56, and tool 51 is surrounded by sleeve 57. This assembly is mounted in blocks 58,59, with a gate 60 provided for introducing resin As would be apparent to one skilled in the art, the exact design or configuration to accommodate the molding tools will depend on the injection molding apparatus.

Although certain preferred embodiments have been described, it is understood that the invention is not limited thereto and modifications and variations would be evident to a person of ordinary skill in the art. As one example, the invention is applicable to toric contact lenses having other ballast means than that illustrated for the described embodiment, and for other types of contact lenses having at least one rotationally asymmetric surface. As another example, the invention is not limited to injection molding of anterior mold sections, but is also applicable to injection molding of posterior mold sections that have a rotationally asymmetric mold cavity defining surface. As yet another example, the invention is applicable to contact lens mold types other than those illustrated in FIGS. 2 to 4, and the various injection molding set-ups therefor.

What is claimed is:

1. A contact lens mold comprising:
   a first concave or convex surface that is rotationally asymmetric for forming a rotationally asymmetric surface of the contact lens thereagainst, a second convex or concave surface opposed to said first surface that is rotationally asymmetric, a segment of said mold between said first and second surfaces having a substantially uniform thickness.

2. The contact lens mold of claim 1, wherein the first surface is a rotationally asymmetric, concave surface with an optical quality finish for molding an anterior contact lens surface thereagainst, and the second surface is a convex surface that is rotationally asymmetric.

3. The contact lens mold of claim 2, wherein the concave surface is shaped to provide ballast to the anterior surface of a contact lens molded thereagainst.

4. The contact lens mold of claim 1, wherein the first surface is shaped to form a toric contact lens surface molded thereagainst.

5. The contact lens mold of claim 4, wherein the first surface is a convex surface to provide a toric contact lens surface thereagainst, and the second surface is a concave surface.

6. A contact lens mold assembly comprising first and second contact lens mold sections, at least one of said first and second contact lens mold sections comprising:

a first concave or convex surface that is rotationally asymmetric for forming a rotationally asymmetric surface of the contact lens thereagainst, a second convex or concave surface opposed to said first surface that is rotationally asymmetric, a segment of said mold between said first and second surfaces having a substantially uniform thickness.

7. The contact lens mold of claim 6, wherein each of said first and second contact lens mold sections comprise:

a first concave or convex surface that is rotationally asymmetric for forming a rotationally asymmetric surface of the contact lens thereagainst, a second convex or concave surface opposed to said first surface that is rotationally asymmetric, a segment of said mold between said first and second surfaces having a substantially uniform thickness.

8. The contact lens mold assembly of claim 7, wherein the first surface of said first mold section is a rotationally asymmetric, concave surface with an optical quality finish for molding an anterior contact lens surface thereagainst, and the second surface is a convex surface that is rotationally asymmetric.

9. The contact lens mold assembly of claim 8, wherein the concave surface is shaped to provide ballast to the anterior surface of a contact lens molded thereagainst.

10. The contact lens mold assembly of claim 9, wherein the convex surface of said second mold section is shaped to provide a toric surface to the posterior surface of a contact lens molded thereagainst.

11. The contact lens mold of claim 1, wherein the thickness of said segment varies no more than 0.2 mm across a profile thereof.

12. The contact lens mold of claim 11, wherein the thickness of said segment varies no more than 0.1 mm across a profile thereof.

13. The contact lens mold of claim 6, wherein the thickness of said segment varies no more than 0.2 mm across a profile thereof.

14. The contact lens mold of claim 13, wherein the thickness of said segment varies no more than 0.1 mm across a profile thereof.

* * * * *